April 6, 1937.   H. R. VAN DEVENTER ET AL   2,075,840
COMBINED REFRIGERATING AND POWER ACTUATED DEVICE
Original Filed Aug. 7, 1929   7 Sheets-Sheet 1

INVENTORS.
HARRY R. VAN DEVENTER.
SAMUEL C. MCKEOWN.
BY
ATTORNEY.

April 6, 1937. H. R. VAN DEVENTER ET AL 2,075,840
COMBINED REFRIGERATING AND POWER ACTUATED DEVICE
Original Filed Aug. 7, 1929 7 Sheets-Sheet 2
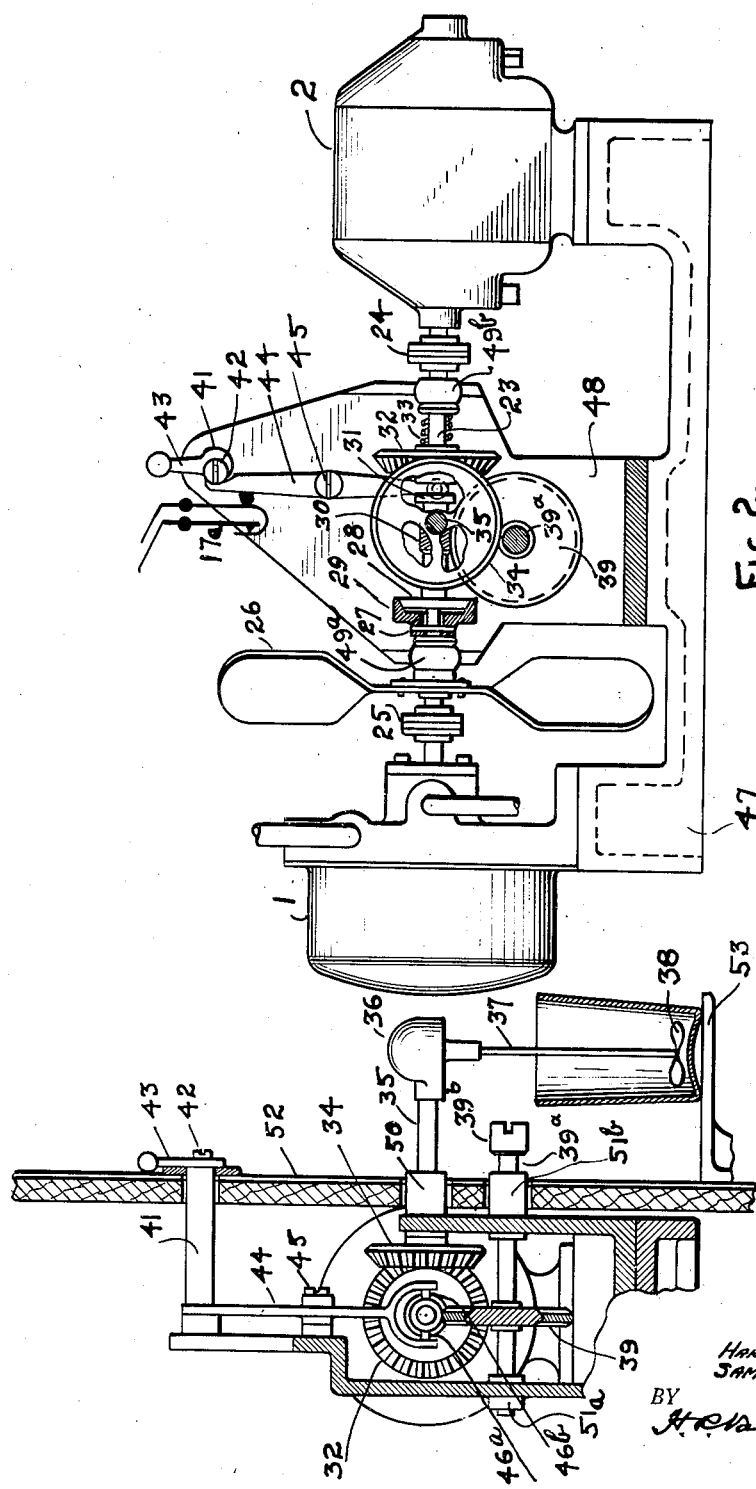
INVENTORS.
HARRY R. VAN DEVENTER.
SAMUEL C. McKEOWN.
BY
ATTORNEY.

April 6, 1937.  H. R. VAN DEVENTER ET AL  2,075,840
COMBINED REFRIGERATING AND POWER ACTUATED DEVICE
Original Filed Aug. 7, 1929  7 Sheets-Sheet 3
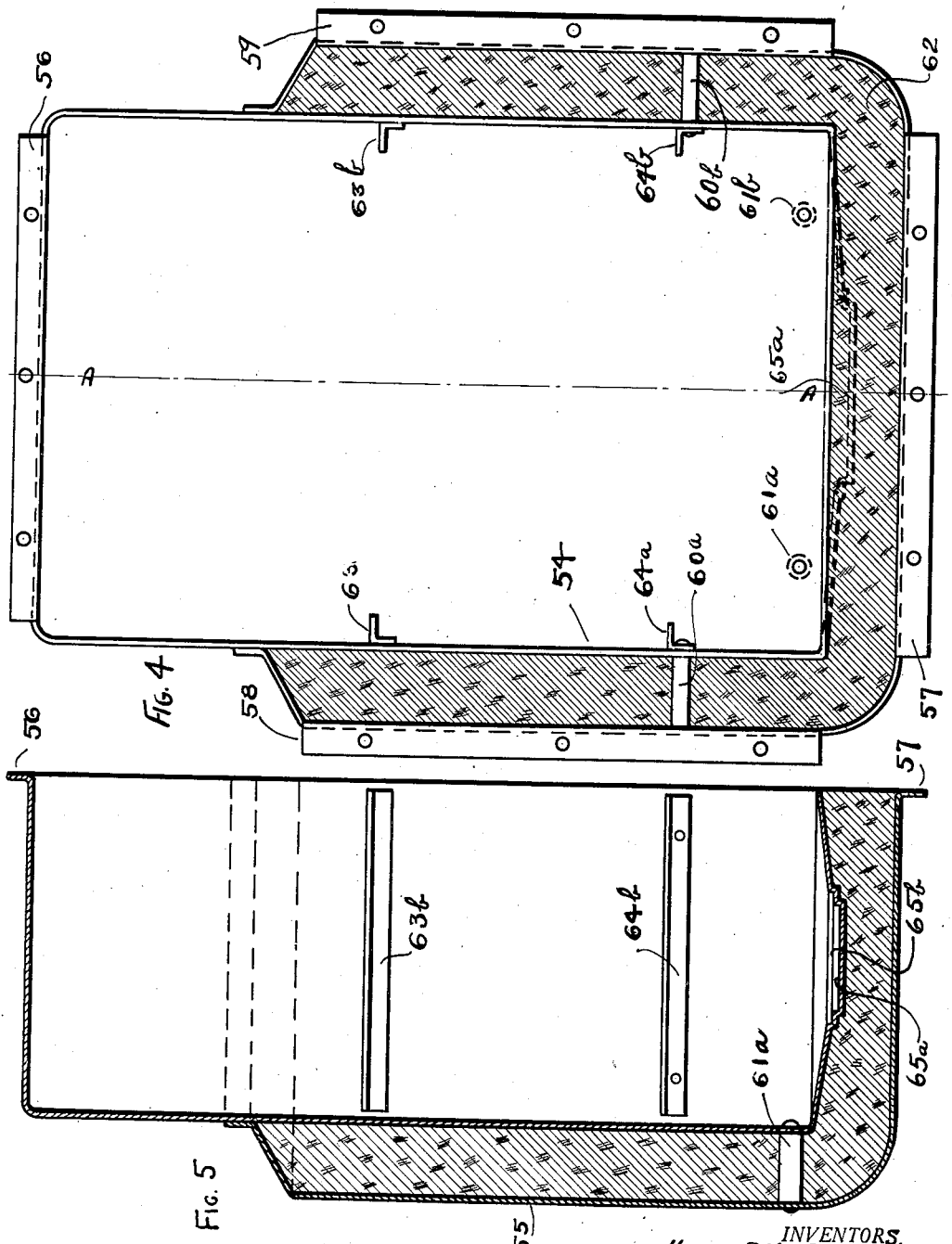

April 6, 1937. H. R. VAN DEVENTER ET AL 2,075,840
COMBINED REFRIGERATING AND POWER ACTUATED DEVICE
Original Filed Aug. 7, 1929  7 Sheets-Sheet 4
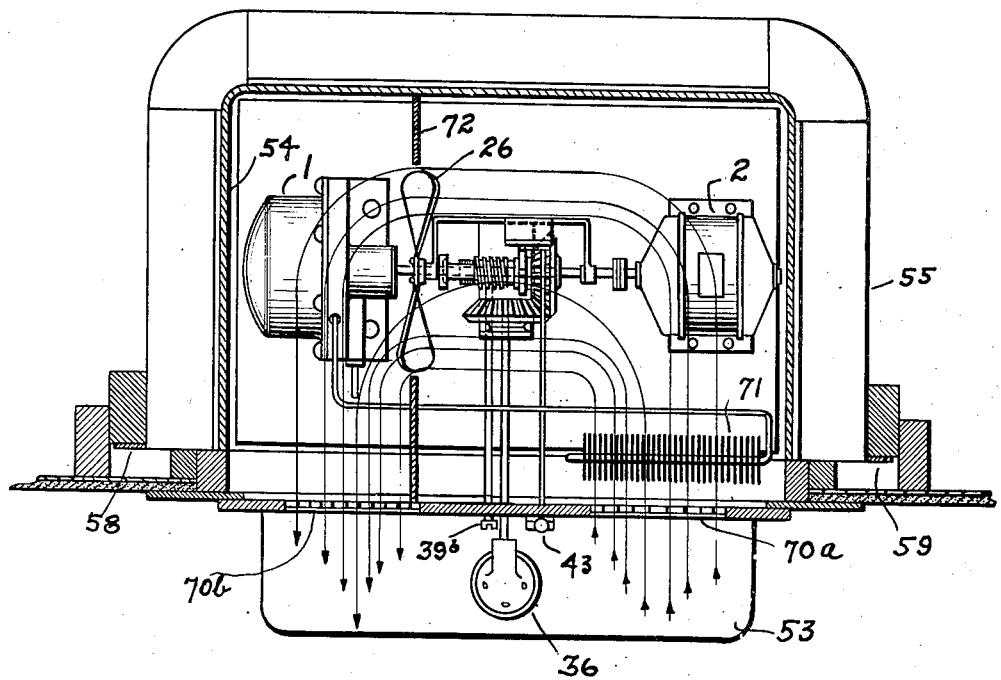
Fig. 6.
Fig. 11.
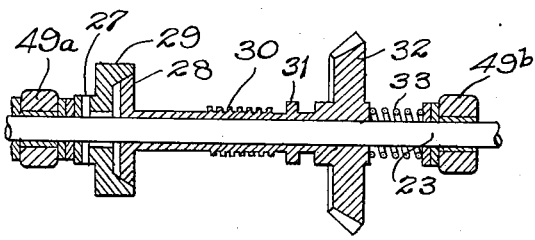
INVENTORS.
HARRY R. VAN DEVENTER.
SAMUEL C. McKEOWN.
BY
ATTORNEY.

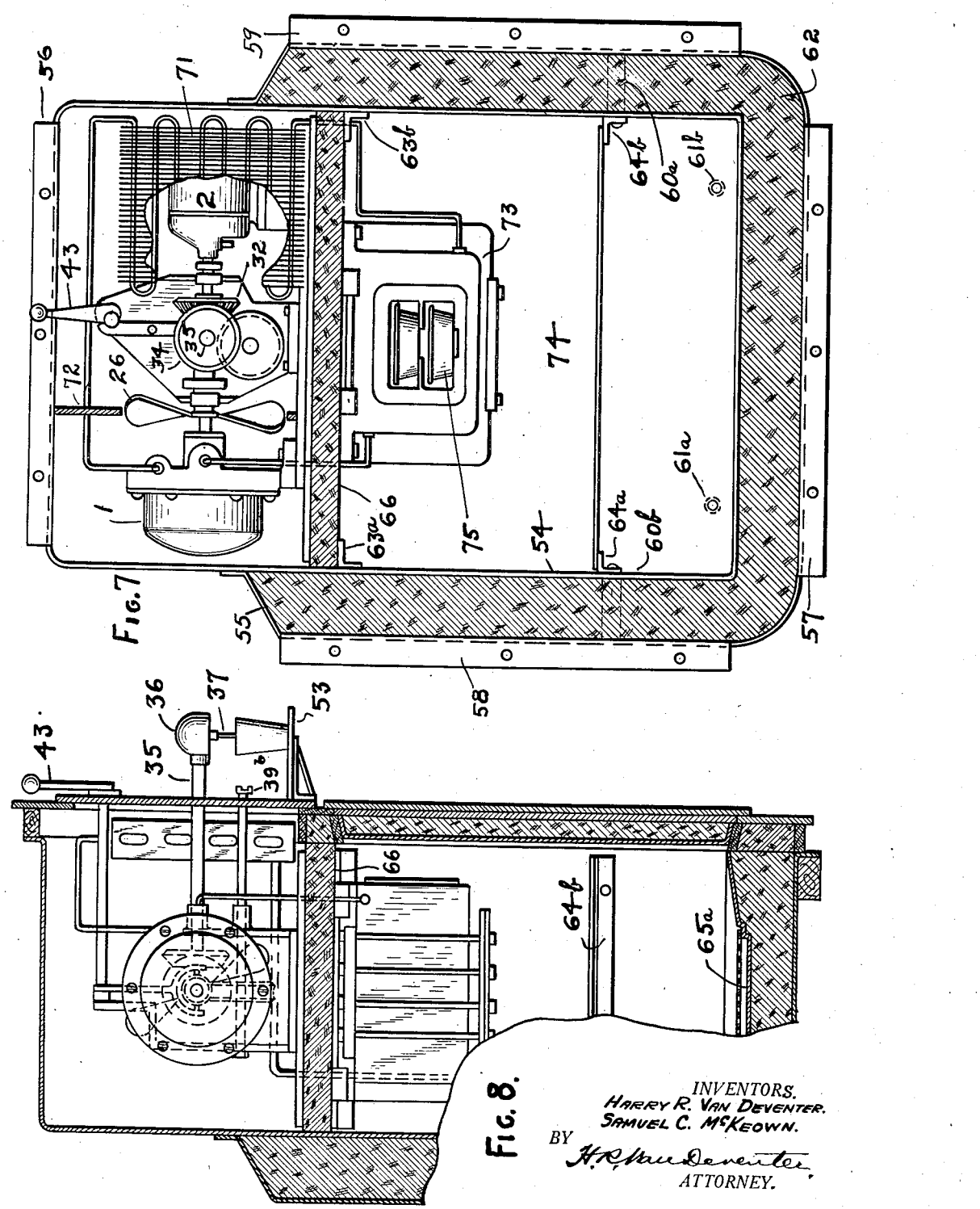

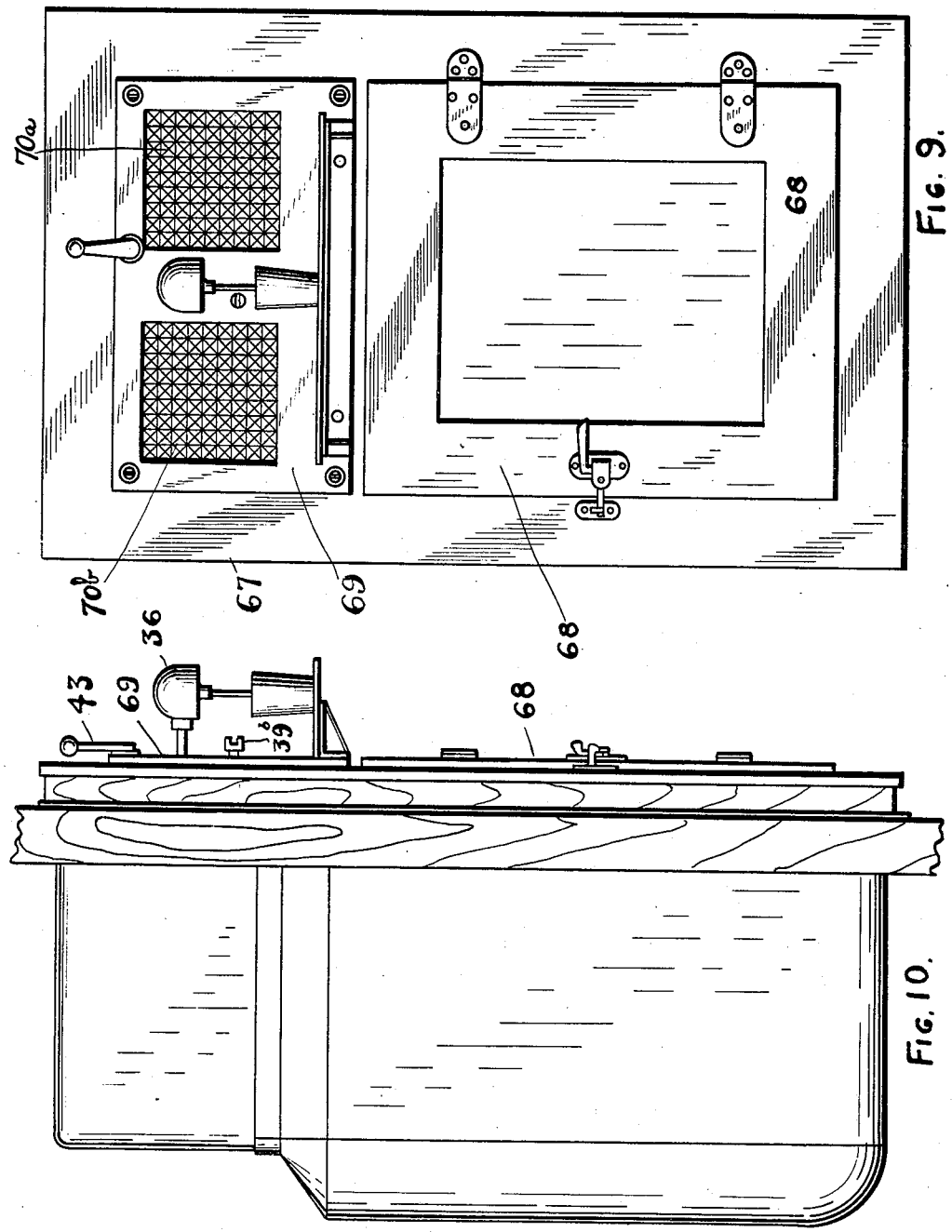

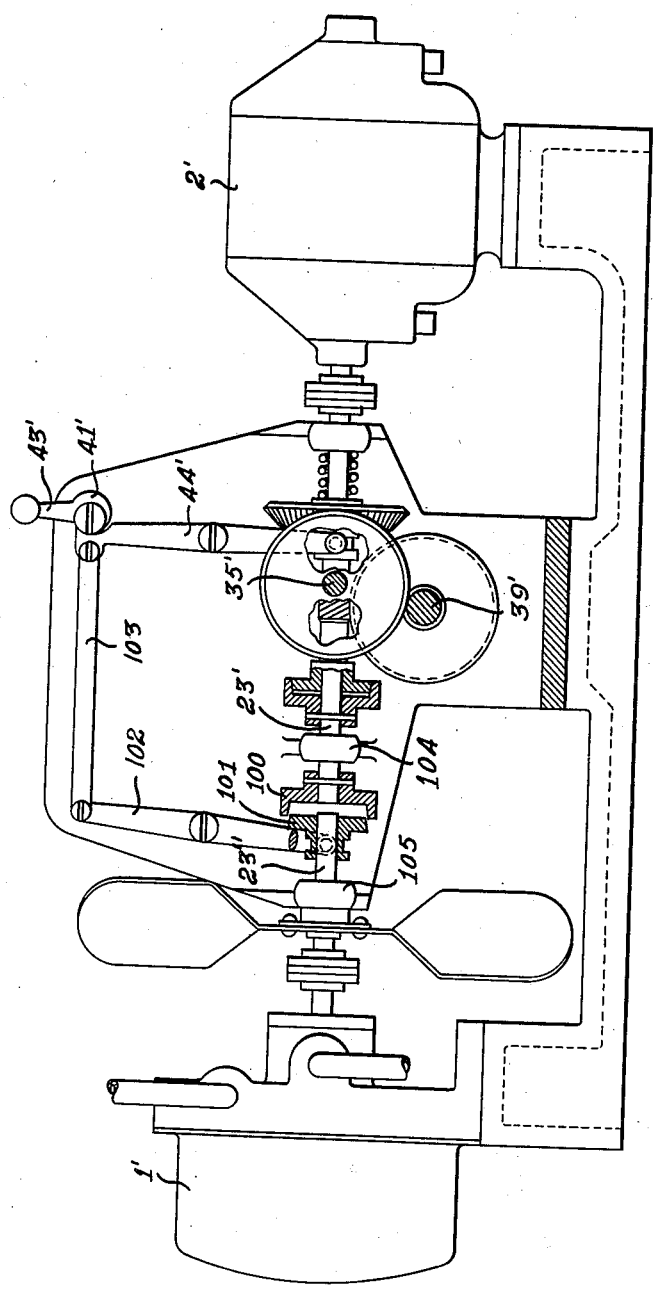

Patented Apr. 6, 1937

2,075,840

UNITED STATES PATENT OFFICE 2,075,840

COMBINED REFRIGERATING AND POWER ACTUATED DEVICE

Harry R. Van Deventer, New York, and Samuel C. McKeown, Mount Vernon, N. Y., assignors, by mesne assignments, to General Motors Corporation, a corporation of Delaware Application August 7, 1929, Serial No. 384,014
Renewed November 22, 1934

13 Claims. (Cl. 62—4)

This invention relates to a combined refrigerating machine and power actuated device.

One object of the invention is to use the motor, or other source of power, of a refrigerating machine to actuate other mechanisms such as a cup making machine.

Another object of the invention is to provide a refrigerating machine suitable for household use to which various kitchen appliances, such as meat choppers, potato mashers, drink mixers and the like, may be attached and operated by the motor used for actuating the refrigerating machine.

A further object of the invention is to provide a household refrigerator adapted to be built into the wall of the house or room, having the mechanism removable from the refrigerator without removing the latter from the wall, and also providing means for air cooling the mechanism, without the necessity of an air duct or flue, by means of air circulation from the front of the refrigerator.

There are other objects which will hereinafter more fully appear.

In the accompanying drawings Fig. 1 is partially diagrammatic showing a refrigerating mechanism of a well known type having a cup making machine attached thereto and operated thereby.

Fig. 2 shows another arrangement for utilizing the power from the motor for operating domestic and kitchen devices, such as a drink or food mixer.

Fig. 3 is a side view of Fig. 2 showing a drink mixer in position as an attachment, operated by a high speed drive, and an additional slow speed drive for operating other apparatus.

Fig. 4 is a front view of a cabinet only, for a domestic refrigerator suitable for use with the mechanism shown in Figs. 1 and 2.

Fig. 5 is a sectional view of Fig. 4 on the line A—A.

Fig. 6 is a top view of the mechanism shown in Fig. 2 in position in the cabinet Fig. 4, showing the method of air circulation for cooling the mechanism.

Fig. 7 is a front view showing the mechanism of Fig. 2 in place in the cabinet.

Fig. 8 is a side view of Fig. 7.

Fig. 9 is a front view of the outside of the cabinet and mechanism of Fig. 7 complete with a drink mixer attached to the mechanism.

Fig. 10 is a side view of Fig. 9.

Fig. 11 is an enlarged cross sectional view of a portion of the apparatus shown in Fig. 2.

Fig. 12 is an enlarged view, with parts in cross-section showing a modification in which the compressor is disengaged when the auxiliary shafts are engaged.

Figure 1:
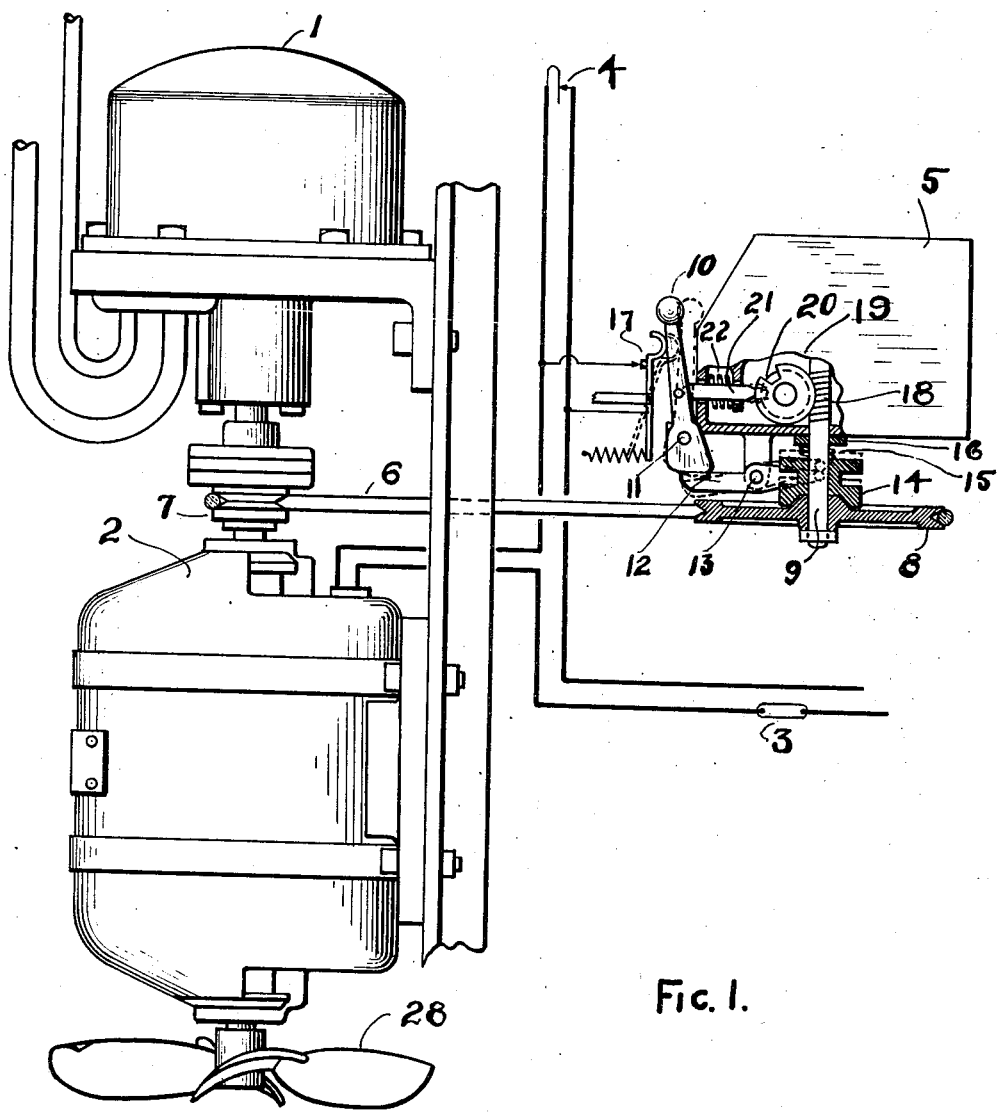

The object of the arrangement shown in Fig. 1 is to provide a means for making up as needed the paper drinking cups commonly used with a power refrigerated water cooler, utilizing the power unit to operate the mechanism for making the cup.

The specific arrangement shown and described herewith is only one of many that may be used and is shown to illustrate the invention. The refrigerating mechanism in a cabinet, the refrigeration cycle, and other details of construction are already well known so they are not herein described, being obvious to those skilled in the art. This mechanism is therefore described as arranged to fit a household refrigerator, although any special cabinet can be used, and only sufficient details of the mechanism are described to illustrate the invention.

The mechanism Fig. 1 consists of any suitable refrigerating machine and includes a pump 1 driven by motor 2, the electrical circuit to the motor being ordinarily controlled by an overload switch 3 and the usual thermostat 4 shown diagrammatically in the drawings.

Any type of cup-making machine 5 driven by a belt 6 passing from the pulley 7 to pulley 8, the latter normally rotating freely on the shaft 9 of the shaft of the cup-making machine 5, leaving the shaft 9 normally stationary. Obviously any other type of drive may be used.

The hand operating lever 10 is fulcrumed at 11 and normally acts as a cam on the lever 12 which, being fulcrumed at 13, acts in turn to raise the clutch collar 14 opposed by the spring 15 abutting the shaft collar 16.

The clutch collar 14 is splined on the shaft 9 so that when lever 10 is operated by the user to make a cup, the lever 12 allows the clutch collar 14 urged by the spring 15, to engage the corresponding clutch face of the moving pulley 8, thereby rotating shaft 9 and operating the cup making machine.

At the beginning of the movement of the lever 10 the switch 17 is closed thereby so that if the thermostat 4 has its contacts open and motor is not already running, it will start up and run the few seconds necessary to make a cup.

Any part of the cup-making machine that synchronizes with the cycle of operation may be utilized to release the lever 10 and thereby disengage the clutch and open the circuit through switch 17 upon the completion of a cup. A portion of the shaft 9 forms a worm 18 designed to rotate the worm gear 19 and bring notch 20 around until the slide pin 21 drops into it, at which time lever 10 flexibly connected to slide pin 21 and impelled by same and its spring 22, moves to the right to normal position, opening the clutch and allowing the pulley 8 to again rotate freely on the shaft 9. Simultaneously lever 10 opens the switch 17, thereby cutting off the motor unless the switch 4 is closed, which is the case when the refrigeration mechanism is operating. The switch 4 may be any of the usual devices for automatically controlling the motor, and may be temperature or pressure operated. The "on" or operating position of lever 10 and its associated mechanism is shown in solid lines Fig. 1, and the "off" or non-operating position is indicated by dotted lines.

The arrangement shown in Figs. 2 and 3 is a modification of the arrangement shown in Fig. 1 designed to utilize the power of the motor for driving various kitchen appliances and the like, adapted to be temporarily connected to the mechanism, two speeds being made available to cover the speed range of the different devices.

The motor 2 drives the pump 1 by means of the shaft 23 and the flexible couplings 24 and 25. The fan 26 is also secured to the shaft 23 to insure the usual circulation of air for cooling the condenser 71 (Fig. 6), the motor 2 and in some cases the pump.

Mounted on shaft 23, and secured thereto by the pin 27 is the female clutch member 29. Engageable therewith, but otherwise rotatable on the shaft 23, is the male clutch member 28 which is preferably integral with the worm 30, the shift collar 31, and the miter gear 32. Under stress of the spring 33 the clutch member 28 engages the clutch member 29, so that the worm 30 and the gear 32 are rotated by the shaft 23. Simultaneously the miter gear 34 rotates the shaft 35, having a suitable clutch similar to clutch 39b adapted to operate the usual detachable gear head 36, the vertical shaft 37, and the mixer blade 38 or any other device desired. At the same time the worm 30 engages and rotates at reduced speed the worm gear 39, its shaft 39a, clutch 39b and any device or mechanism attached thereto. Obviously the gear head 36 may be permanently connected and the device 37 may be detachable instead of the arrangement just described.

To disengage the clutch and stop the motion of shafts 35 and 39a, the small eccentric 41 is partially rotated around its fulcrum 42 by means of lever 43. This rocks the yoke lever 44 on its fulcrum 45 and the pins, 46a, 46b engaging the groove in shift collar 31, and serves to shift the male clutch member 28 longitudinally out of engagement with the female clutch member 29, as well as the miter gear 31 out of engagement with the miter gear 34, thus allowing the shaft 23 to continue in operation driving the pump 1.

The main base 47 supports, in alignment, the pump 1, the motor 2 and frame 48, the latter in turn carrying a main shaft 23 in bearings 49a—49b an auxiliary shaft 35 in bearing 50, and another auxiliary shaft 39a in bearings 51a—51b.

A fulcrum 45, an eccentric 41 and a fulcrum 42 are also mounted on the frame 48.

The front of the containing cabinet as shown at 52 and 53 is a shelf or support for a drinking glass or other container.

Substantially the same switching mechanism is used with the arrangement shown in Figs. 2 and 3 as was described in the arrangement in Fig. 1. The switch 17a is closed when the lever 43 is thrown to "on" or operating position, and opened when 43 is returned to "off" or normal position.

It is well known that there is not enough room in a small kitchen or kitchenette for the ordinary refrigerator cabinet and while obviously a place could be provided for it in the wall, such arrangements necessitate (with existing cabinets) removing the entire cabinet to gain access to the mechanism, and special provision must be made for cooling the condenser and motor and with the additional mechanism for operating attachments as herein described, a special cabinet is desirable. This special cabinet may be easily and cheaply built into the wall of a room or house, and permits ready access to the mechanism for repairs or adjustment without removing the cabinet. When the refrigerating motor is used for operating other power driven devices its utility is greatly increased, as a complete small power plant is at the users disposal without additional room space being necessary if the special cabinet herein described is used.

In Fig. 4 the numeral 54 denotes an inner steel casing, preferably enameled so as to form a suitable refrigerator lining, 55 is an outer steel casing. Both 54 and 55 are provided with suitable flanges 56, 57, 58, 59 and are secured together in any suitable manner such as by heat insulating members, some of which are shown at 60a, 60b, 61a, 61b. This arrangement provides a cabinet having a hollow wall which may be filled with any suitable heat insulating medium such as cork, wool, wood or the like, this forming the usual refrigerator wall. This form of construction allows the inner and outer members to be shipped "knocked down" to the building where they are to be used, and there assembled and the insulation 62 put in place, resulting in a large saving in transportation charges.

The cabinet is provided with the angle strips 63a, 63b, 64a, 64b, which support the mechanism and the shelves. The bottom of the inner casing may be formed with a depression 65a for collecting the drip when defrosting or a pan 65b may be placed in the depression as shown in the figure.

The mechanisms Figs. 1 and 2, or any suitable refrigerating machine only, may be used. This is mounted on a shelf 66 preferably of heat insulating material, adapted to slide into the cabinet and form the top of the food compartment, as shown in Figs. 7 and 8, the shelf 66 being removably supported by the angle strips 63a, 63b.

It will now be obvious that the cabinet complete with its lining 62 can be set into a wall the outer edge flush therewith, and left without the shelf 66 and the mechanism carried thereby, which may be put in place when actually required for use, and furthermore, that all the mechanism is removable at any time without disconnecting any of its component parts and without removing the cabinet from the wall.

As the cabinet sets in a wall usually of brick or tile which are in themselves good insulators, the amount of insulation at 62 may be reduced to a minimum.

The cabinet is set in the wall by securing the same thereto by means of nails, screws or bolts through flanges 56, 57, 58, 59 into the wall, or into the studding set therein. To secure a finish and provide a front for the cabinet, a plate or trim 67 is provided carrying hinges and locks for the refrigerator door 68.

A panel 69 attached to plate 67 by screws or any other suitable manner is provided to cover the machine compartment. This arrangement provides a cabinet practically flush with the wall.

Proper cooling of the condenser and motor is accomplished as shown in Fig. 6 by providing the panel 69 with grids, louvres or some such openings 70a, 70b. The air is drawn by fan 26 into the openings in 70a, passes over or through the condenser 71, the motor 2, and if necessary over the pump 1 and is discharged at 70b. The fan 26 may be placed in a suitable shroud or partition 72 dividing the machine compartment between 70a and 70b, to insure proper air circulation.

The operation of the refrigerating mechanism is not described in detail as any suitable type of apparatus may be used. The evaporator or cooling unit 73 is supported below the shelf 66 and extends downwardly into the food chamber and may be provided with the usual ice trays 75.

In the modification shown in Fig. 12, the motor 2' drives the compressor 1' substantially in the same manner as shown in Fig. 2. However, in this modification, the compressor 1' is disengaged from the motor 2' when the shafts 39' and 35' are clutched to the motor. This is accomplished by splitting the drive shaft between the motor and the compressor into two portions 23' and 23''. A clutch member 100 is keyed to the shaft 23' and the cooperating clutch member 101 is slidably keyed on the shaft 23''. The clutch member 101 is actuated by the pivoted arm member 102 which is connected by a link 103 with the pivoted arm 44' which corresponds to the arm 44 of Fig. 2. An actuating lever 43' having a cam 41' actuates the linkage so as to clutch and declutch the shafts 35' and 39' inversely to the shaft 23'. It will be readily understood that the other parts of the system, including the wiring control, may be substantially the same as in Fig. 2. A bearing 104 is added in order to support the free end of the shaft 23' while a bearing 105 is provided to support the free end of the shaft 23''.

We claim:

1. A refrigerating machine including a compressor, condenser and evaporator in circuit relation, a source of power for said compressor and control means therefor, a mechanism separate from said compressor adapted to be operated from said power source, means for manually connecting said mechanism to said power source and means for rendering said control means inoperative during the period said mechanism is connected to the power source.

2. A refrigerating machine including a compressor, a condenser and evaporator in circuit relation, a motor for said compressor and control means therefor, a mechanism separate from said compressor adapted to be operated by said motor, manual means for connecting said motor and mechanism and means synchronized with said manual means for controlling said motor during the operating period of the mechanism.

3. A refrigerating machine including a compressor, condenser and evaporator in circuit relation, a motor for said compressor and control means therefor, a mechanism separate from said compressor adapted to be operated by said motor, means for connecting said motor and mechanism, means operated by said last means to control said motor and means controlled by said mechanism for automatically disconnecting the same from the motor.

4. A refrigerating machine including a compressor, condenser and evaporator in circuit relation, a motor for said compressor and control therefor, a mechanism separate from said compressor adapted to be operated by said motor, said mechanism including a plurality of shafts operating at different speeds, manually controlled means for connecting said mechanism to the motor and means connected to said last mentioned means for causing the operation of the motor when the mechanism is connected to the motor.

5. A refrigerating machine including a compressor, condenser and evaporator in circuit relation, a motor for said compressor, a mechanism separate from said compressor adapted to be operated by said motor, a cabinet enclosing said motor and mechanism, a shaft projecting from said cabinet and driven by said motor through said mechanism, and a device outside said cabinet operatively connected to said shaft and a single means positioned outside of the cabinet for controlling the operation of the motor and said shaft.

6. A refrigerating machine including a compressor, condenser and evaporator in circuit relation, a motor for said compressor and control therefor, a mechanism separate from said compressor adapted to be operated by said motor, said mechanism including a manually operatable clutch, and means operated in synchronism with the clutch for causing the motor to be operated independently of its aforesaid control.

7. In a refrigerating machine including a compressor, condenser and evaporator in circuit relation, a base, a motor for said compressor and said compressor being supported thereby and having shafts in alignment, a clutch adapted to engage a part operated by said motor and a plurality of switches for controlling said motor, one of said switches adapted to be operated in unison with said clutch.

8. A refrigerating machine including an evaporator and a refrigerant liquefying unit in circuit relation, a motor for said unit, a thermostatic control for said motor, a mechanism separate from said unit adapted to be operated by said motor, a cabinet having a machine compartment enclosing said motor and unit, a shaft driven by said motor through said mechanism, a device operatively connected to said shaft, and a control outside said machine compartment for controlling the operation of said motor and said shaft independently of said thermostatic control.

9. A refrigerating machine including an evaporator and a refrigerant liquefying unit in circuit relation, a motor for said unit, a thermostatic control for said motor, a mechanism separate from said unit adapted to be operated by said motor, a cabinet having a machine compartment enclosing said motor and unit, a shaft driven by said motor through said mechanism, a device operatively connected to said shaft, a control outside said machine compartment for controlling the operation of said motor and said shaft independently of said thermostatic control, and a connection outside said machine compartment driven by said motor.

10. A refrigerating machine including a compressor, condenser and evaporator in circuit relation, a source of power for said compressor and control means therefor, a mechanism separate from said compressor adapted to be operated from said power source, a control for connecting and disconnecting said mechanism to said power source and means automatically rendering said control means inoperative during the period said mechanism is connected to said power source.

11. A refrigerating machine including a compressor, condenser and evaporator in circuit relation, a motor for said compressor and control means therefor, a mechanism separate from said compressor adapted to be operated by said motor, means for connecting and disconnecting said motor and mechanism and means synchronized with said means for connecting and disconnecting for controlling said motor during the operating period of the mechanism.

12. A refrigerating machine including a compressor, condenser and evaporator in circuit relation, a motor for said compressor and control therefor, a mechanism separate from said compressor adapted to be operated by said motor, said mechanism including a plurality of shafts operating at different speeds, means for connecting and disconnecting said mechanism to the motor and means connected to said last mentioned means for causing the operation of the motor when the mechanism is connected to the motor.

13. In a refrigerating machine, a base, a motor supported thereby having a shaft, a compressor adapted to be operated from said motor, means for engaging and disengaging said compressor from the motor, a member for operating said means, a fan driven by said motor and adapted to circulate air, gearing adapted to be operated from the motor, and means for manually engaging and disengaging said gearing with the motor shaft.

HARRY R. VAN DEVENTER.
SAMUEL C. McKEOWN.